United States Patent [19]

Jaklin

[11] Patent Number: 4,867,791

[45] Date of Patent: Sep. 19, 1989

[54] PROCESS FOR SUBSURFACE RECONSTRUCTION OF BUILDINGS REINFORCED WITH CONSTRUCTIONAL STEEL

[76] Inventor: Hans Jaklin, Erlenhof, Aacherweg 15, D-5500 Trier, Fed. Rep. of Germany

[21] Appl. No.: 130,695

[22] Filed: Dec. 9, 1987

[51] Int. Cl.$^4$ ............................................. C04B 12/04
[52] U.S. Cl. ................................. 106/74; 106/14.21; 106/76; 52/514
[58] Field of Search .................... 106/14.05, 14.21, 74, 106/76; 422/7; 428/378; 52/514

[56] References Cited

U.S. PATENT DOCUMENTS

| | | | |
|---|---|---|---|
| 1,129,320 | 2/1915 | Vail et al. | 106/74 |
| 2,879,578 | 3/1959 | Ulfstedt | 106/14.21 |
| 2,944,919 | 7/1960 | Morris et al. | 106/14.21 |
| 3,180,746 | 4/1965 | Patton et al. | 106/74 |

FOREIGN PATENT DOCUMENTS 61-102969  5/1986  Japan ..................... 52/514

OTHER PUBLICATIONS

Heinrich Remy, "Lehrbuch de Anorganischen Chemie," vol. 1, 1952, pp. 421, 735–736.
"Kieselsäure als Verstärkerfüllstoff" (Silic acid as a reinforcing filler), pp. 38, 39 and 42.

*Primary Examiner*—William R. Dixon, Jr.
*Assistant Examiner*—David M. Brunsman
*Attorney, Agent, or Firm*—Sprung Horn Kramer & Woods

[57] ABSTRACT

For the subsurface reconstruction of buildings reinforced with constructional steel, the damaged concrete is drilled into until behind the corroded reinforcement, a solution of a modified alkali silicate having a $Me_2O$:$SiO_2$ ratio of 1:2 to 1:3 is injected into the drilling hole under pressure and thereafter a cement-water sludge with alkali silicate solution or a mortar mixture is injected under pressure containing 2 to 6% by weight relative to the amount of cement of a finely composed amorphous silicic acid with at least 90% by weight $SiO_2$ or finely composed, precipitated, active silicates of magnesium, calcium, barium or aluminum with a BET surface of 50 to 200 m$^2$/g and a $d_5$% value below 20 $\mu$m.

4 Claims, No Drawings

PROCESS FOR SUBSURFACE RECONSTRUCTION OF BUILDINGS REINFORCED WITH CONSTRUCTIONAL STEEL

In structures made of reinforced concrete the concrete has two functions to fulfill. It has to absorb compressive strains and it has to protect the steel against corrosion. The reinforced steel serves the function of absorbing the shear and tensile strength.

The protective effect of the hardened cement paste for the iron and its duration are dependent on several factors. On the one hand there are the climatic and environmental conditions and on the other hand there is the quality of the concrete which is primarily determined by the amounts of cement, the grain of the concrete aggregate, the water cement factor and the concrete compression.

The protective effect of the concrete for the iron is dependent on the high alkalinity of the $Ca(OH)_2$ produced during hydrolysis—pH around 13. The carbonic acid formed by the carbon dioxide in the air together with water reacts with the calcium ions of the calcium silicate hydrate or calcium aluminate hydrate phases of the hardened cement paste forming calcium carbonate. The concrete carbonates, as this process is generally called, at a concrete dampness, which arises at a relative humidity of under around 60%. If the concrete pores are practically completely filled with water, the carbonation comes to a halt. How quickly and how deep the carbonation penetrates the concrete depends on the dampness of the concrete and its structure. In the case of complete carbonation the pH value of the concrete drops to around 8. The corrosion of the iron still does not need to set in if as in the inner spaces the concrete is dry. Concrete dampnesses which come about at relative humidities of between 80 and 100%, lead to the formation of rust on the reinforced iron, as soon as the pH value of the surrounding institial fluid drops below 9.5. The corrosion is increased substantially by salts (thawing salts) which penetrate together with the water. In particular the chloride ions lead to the feared holes being eaten in the iron, which then reduces the supporting capacity of the structure. But also the overall surface corrosion of the iron, which only leads to an insignificant loss in strength of the building structure in the beginning, can already cause large follow-up damage. The take up of oxygen and hydration water increases the weight of the corrosion product, $Fe_2O_3 \times H_2O$, referring to the amount of corroded iron to the amount of absorbed hydration water. Depending upon the amount of the absorbed hydration water and the embedded salts the corrosion products of the steel can take on four to eight times the original volume. As a result of the increase in volume first of all the surface layers split away. Later cracks form throughout the entire building.

An entire system of steps is necessary to repair reinforced concrete which has been damaged in this manner. This system must be adapted to the characteristics of the corroded steel and the carbonated concrete. A lasting reconstruction of the building can only be attained, if one succeeds in 1. eliminating any further corrosion of the steel,
2. reinstating a strong bond between the steel and the concrete,
3. filling the missing spots with a repairing mortar which adheres tightly to the old concrete and the iron and then
4. in sealing the entire outer surface of the structure against the penetration of moisture.

If we disregard the secondary work necessary, we can easily divide the repair process into two phases. The first concerns putting an end to the corrosion of the steel and the second concerns filling the holes and cracks in the concrete surface.

The known surface processes require eight steps which in part are very complicated: After the concrete steel is uncovered the steel has to be sand blasted until is has a metallic shine. As a third step a protective coating is applied to the steel which is then sprinkled with sand which serves as an adhesive bridge for the repair mortar, before the protective coating dries. In the fourth step the cavities in the concrete surface are coated with a sand-polymer-cement-water mixture so that the filling mixture consisting of a synthetic cement mortar bonds well to the old concrete. The further steps involve the final treatment of the conncrete surface, the evening out of the concrete surface, coating the same with a primer and applying a protective coating which prevents the carbonation of the upper concrete layers. (Paint & Resin Oct. 1984, P. 33–37)

The complete sand blast removal of rust is only possible all over, if the constructional steel can be uncovered enough, in particular the space between the reverse side of the steel and the concrete has to be big enough so that the spray jet can be introduced into it to remove the rust.

DE-OS No. 35 13 566 describes a process for inhibiting the corrosion of steel material, which is built into anorgainc building materials, the reinforced concrete surface of which is impregnated consecutively with an aqueous solution of an inorganic salt which has a corrosion inhibiting effect on the steel material and with an aqueous solution of a water-soluble silicate. Nitrites, in particular, are used as corrosion protection inhibiting salts. It is determined in this reference that alkali silitcates alone do not produce an adequate corrosion protection.

The repair mortar described in the literature contains besides cement, sand and water also synthetic resin dispersions. To 1 part by volume (loose pouring) cement 0.1 to 1.0 part by volume synthetic dispersion are used. With respect to the cement that is around 8 to 48% in weight of synthetic resin dispersion. Working with cement mortar tempered and hardened with synthetic resin (KVZ mortar) is made more difficult by the fact that it has to be processed within 30 to 45 minutes or else setting difficulties arise. Further atmospheric conditions and the degree of dampness of the concrete foundation hamper the repair work. At temperatures below 5° to 8° C., if it rains and conditions are damp and cold and the foundation is wet working with this mortar group is out of the question.

Whereas cement hardens hydraulically, i.e. requiring water to set, contrarily the synthetic resin part of the mortar hardens after the water has evaporated. Therefore there is no need for subsequent wetting of the repair layer, which however is detrimental to the cement components in the case of low relative humidities. The conflicting chemical and physical character of cement and synthetic resin dispersion and of hardened concrete and synthetic resin makes the use of KVZ mortar problematic, the higher the amount of synthetic resin.

In wet years still another disadvantage of repairing walls with KVZ mortar showed up. The facades became green with algae. Building components containing synthetic resins, if sufficient dampness occurs, are a good nutritive medium for parasites and other lower life forms.

The two-component synthetic resin mortar with an epoxy resin or polyurethane base do not need to be treated here as extraneous to this type of mortar, although they too are suitable for repairing concrete surfaces under certain conditions.

The great expense including the secondary work of removing the rust (further chiselling out of the concrete and the sand blasting) and the work of producing a protective coating with the known anticorrosive paints which completely covers the steel as well as the problems which may arise through the use of alkali sensitive finishing coats (concrete pH=around 13), indicate the necessity for a simplification and improvement of the processes for reconstructing building structures made of reinforced concrete.

It was not possible with the known working processes and the known means to reconstruct steel structures or brick veneered steel constructions through and through.

The object of the invention is to reconstruct buildings which are made of reinforced concrete or of steel constructions, which have a sandstone, a natural stone, a concrete stone or brick stone veneer, in other words buildings made of a combination steel and silicate materials. An additional damage promoting factor along with the problems of reinforced concrete structures already described is the formation of cracks in the bonding of stone and the joint-filling mortar which is caused by the varying behavior of these materials under temperature fluctuation.

Whereas in the case of reinforced concrete following appropriate construction mainly only the surface and the layers near the surface exhibit cracks, for this type of structure the cracks run throughout the entire width of the wall right on through to the support construction.

The rain water, which always contains oxygen dissolved in it, can penetrate to the iron practically without any problem. The salts also have a corrosion promoting effect. They are transported dissolved in the rain water on their way from the outer lay through the mortar and the cracks in the stone.

According to the process of this invention for subsurface reconstruction of structures made of a combination of steel and silicate materials the damaged concrete or the damaged veneer is first drilled through to behind the corroded reinforcement or to the steel construction without damaging the steel parts in doing so. Then the solution of a modified alkali silicate having a $Me_2O : SiO_2$ ratio of 1:2 to 1:3 is injected. Depending on the local conditions a pressure is required of between 0.1 $N/mm^2$ to 7 $N/mm^2$ and maximum 25 $N/mm^2$. Under similar pressure conditions a cement-water sludge preferably with the addition thereto of a small amount of the above described modified alkali silicate solution is injected until the pressure in the system remains constant without the material being transported. Instead of the cement sludge a fine sand mortar may also be used, which relative to the amount of cement contains 2 to 6% by weight of a finely composed amorphous silicic acid having at least 90% by weight of $SiO_2$, or finely composed, precipitated active silicates of magnesium, calcium, barium or aluminum, which has a specific surface according to BET of between 50 to 200 $m^2/g$ and a $d_{50\%}$-value below 20 $\mu M$. After the injection supports have been removed from the drilling holes, the holes are filled and closed off with a mortar mixture of type described above. Finally the outer surface of the reconstructed building parts is saturated with the modified alkali silicate solution used in the first process step.

In the above general formula $Me_2O$ for the alkali oxide part of the modified alkali silicate Me means an alkali metal such as lithium, sodium or potassium, preferably a mixture of potassium and sodium. A percent by volume of the alkali silicate is usually diluted with 0.5 to 2 percent by volume water if it is used in treating surfaces. That corresponds to $SiO_2$ concentrations in the solution of around 7 to 20 percent by weight. The BET method used hereinabove and hereinbelow for determining the surface by calculating the monolayer capacity is from Brunauer, Emmet and Teller and is described inter alia in "Ullmanns Enzyklopädie der technischen Chemie, Band II/1", P. 758/579.

For the grain analysis an apparatus made by the Cilas company is used. It functions according to the laser beam method. This method is described by J. Swithenbank et al. in "Experimental diagnostics in gas phase combustion systems, Progress in Astronautics and Aeronautics, Vol. 53, (1977)".

Preferred as the finely composed silicates added to the mortar are barium silicate with a composition of 40% BaO, 52% $SiO_2$ and 8% annealing loss or a sodium aluminum silicate with a composition of 73% $SiO_2$, 7% $Al_2O_3$, 7% $Na_2O$ and 12% annealing loss.

It is surprising that the combination of the steps of the invention together with the means used in the invention is sufficient to reconstruct structures made of reinforced concrete or steel constructions, which have a sandstone, concrete stone or brickstone veneer, in a simple and lasting manner.

The above described method for subsurface reconstruction can also be applied to structures without a steel construction which exhibit too low a strength or which are not water-tight. The compressive strength of the building components treated by means of the method for subsurface reconstruction defined in the invention is increased and between these components a water-tight structure is produced.

The relatively low amount of between 2 - 6 percent by weight of a finely composed amorphous silicic acid or a Na-Al-silicate improves the processing characteristics of the cement-sand-water mixture with practically unchanged setting behavior.

There is no phase separation which occurs by the floating of fine cement to the surface of the water; in other words the socalled bleeding of the mortar or of the concrete is completely eliminated. This mortar mixture with the same water/cement factor is also more plastic. Therefore the mortar can be injected better into narrow joints and the surface can be spread more smoothly. The repair mortar used in the invention is also water-tight without any subsequent treatment, while maintaining its permeability to water vapor.

The followoing example will explain the method of the invention in more detail.

EXAMPLE 1

For subsurface reconstruction drilling holes of a diameter between around 6 to 23 mm are set so close to one another that injection material injected into one drilling hole can penetrate to adjacent drilling holes.

The material used for the first injection consists of a modified alkali silicate solution with the following composition:

| | | |
|---|---|---|
| $SiO_2$ | 19.14% | |
| $Na_2O$ | 7.54% | |
| $CrO_4^{-2}$ | 0.31% | |
| $CO_2$ | 0.7% | |
| Ethanol | 0.92% | |

The rest to 100% consisted of water

| Weight ratio SiO: Na O = 2.54:1 | |
|---|---|
| Density | 1.251 |
| Viscosity | 10.1 cP |
| Surface tension | 54 dyn/cm |
| pH value | 11.4 |

The injection pressure is dependent on the quality and original state of the building structure to be treated and ranges from 5 to 70 bar. The injection of this solution is continued until saturation of the solidium of the building is attained, this being indicated by pressure constancy in the pump system.

The material for the second injection consists of a water-cement sludge with addition of 2 to 6% by weight, relative to the amount of the cement, of an active silicic acid or an active Na-Al-silicate and/or a modified alkali silicate solution with the above indicated composition. The water/cement factor is variable and has to be adapted to the pore structure of the building structure. Instead of the cement sludge a fine sand mortar can be used, especially if large inner cracks and larger caverns are present in the solidium of the building. The complete filling of the hollow cavities is also indicated here by a constant pressure of 5–70 bar.

Finally the drilling holes are filled and closed off by hand using the mortar of this invention.

It will be understood that the specification and examples are illustrative but not limitative of the present invention and that other embodiments within the spirit and scope of the invention will suggest themselves to those skilled in the art.

What is claimed is:

1. A method for the subsurface reconstruction of a building reinforced with constructional steel, comprising drilling into the damaged concrete until behind the corroded reinforcement, injecting into the drilling hole a solution of a modified alkali metal silicate having an alkali metal oxide:$SiO_2$ ratio of 1:2 to 1:3, and then injecting into the drilling hole a cementwater sludge with alkali silicate solution or a mortar mixture containing 2 to 6% by weight relative to the amount of cement of (a) a finely composed amorphous silicic acid with at least 90% by weight $SiO_2$ or (b) a finely composed, precipitated, active magnesium silicate, calcium silicate, barium silicate or aluinum silicate, each with a BET surface of 50 to 200 $m^2/g$ and a $d_{50}\%$ value below 20 $\mu m$.

2. The method according to claim 1, wherein the final injected material contains a finely composed precipitated silicate exhibiting a $SiO_2$ content of 56 to 85% on a water-free basis.

3. The method according to claim 1, wherein the final injected material contains a finely composed precipitated active amorphous aluminum silicate containing 5 to 15% by weight $Al_2O_3$ and 1 to 10% by weight $Na_2O$ on a water-free basis.

4. The method according to claim 1, including the further step of saturating the entire concrete surface of the reconstructed building component with a solution of the modified alkali metal silicate after setting of the mortar cement-water sludge is completed.

* * * * *